D. H. JAMES.
VEHICLE.
APPLICATION FILED MA... 8, 1909.
931,614.
Patented Aug. 17, 1909.
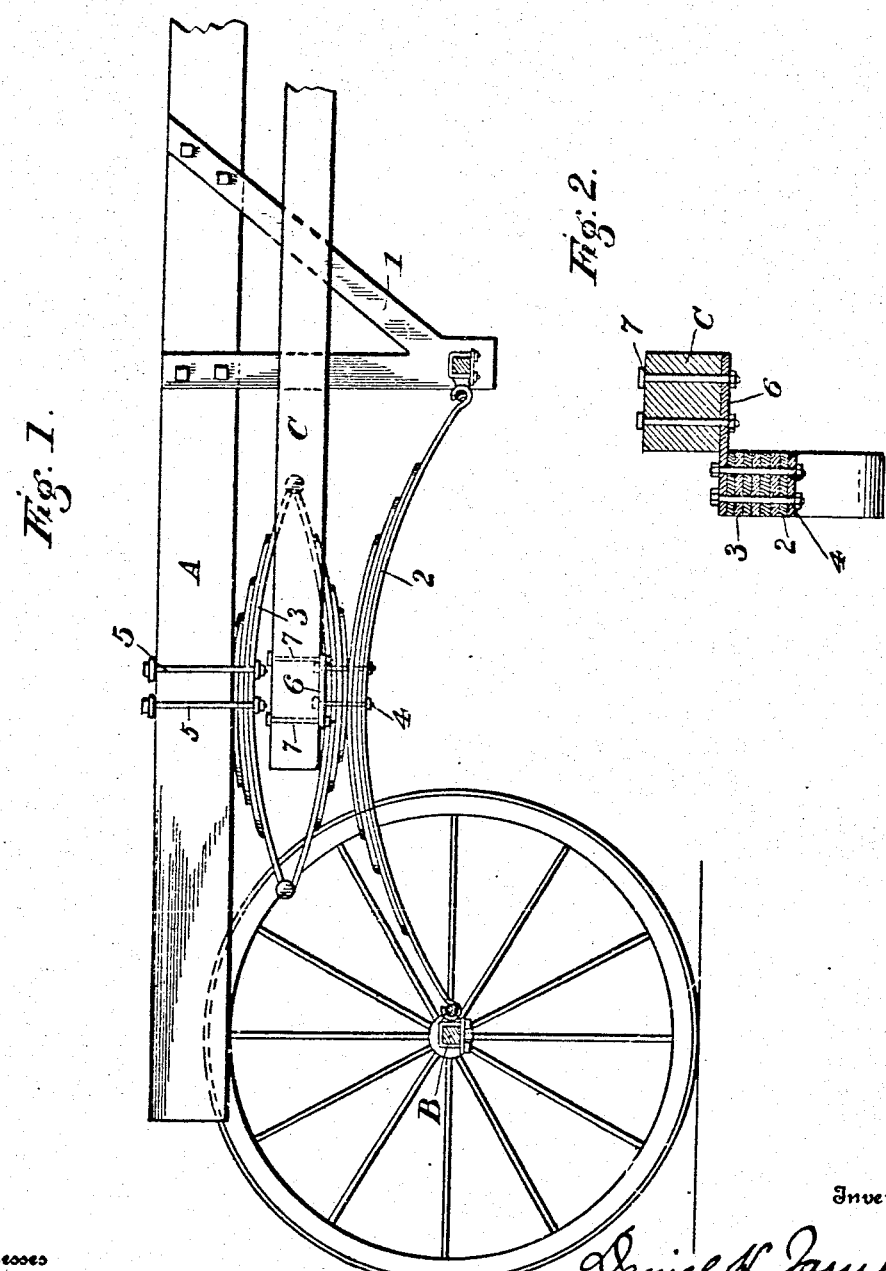

UNITED STATES PATENT OFFICE.

DANIEL H. JAMES, OF TOLEDO, OHIO.

VEHICLE.

No. 931,614.   Specification of Letters Patent.   Patented Aug. 17, 1909.

Application filed March 8, 1909. Serial No. 481,963.

*To all whom it may concern:*

Be it known that I, DANIEL H. JAMES, a citizen of the United States, residing at Toledo, in the county of Lucas and State of Ohio, have invented certain new and useful Improvements in Vehicles, of which the following is a specification.

My invention relates to an improvement in vehicles, and the object is to provide means for relieving the body of a vehicle from the jar and vibration incident to a vehicle traveling over rough roads or obstacles, and to relieve the body of a motor vehicle of the vibration caused by an engine when in operation.

The invention consists of certain novel features of construction and combinations of parts which will be hereinafter fully described and pointed out in the claims.

In the accompanying drawings—Figure 1 is a longitudinal sectional view of a portion of a vehicle showing my invention applied thereto, and Fig. 2 is a sectional view showing the attachment of the frame or body for supporting the engine.

A represents the body of a vehicle, and B is the axle. A bracket, 1, is connected to the body, A, and pivotally connected to the axle, B, and bracket, 1, is a platform spring, 2. Connected to the platform spring is an elliptical spring, 3, connected by a clamp, 4. The upper portion of the elliptical spring is connected in any suitable manner to the body, A, of the vehicle by any construction of hanger desired, but I have shown the spring connected by a clamp or hanger, 5, to the body.

C, represents a bed or frame for an engine (not shown), which is connected or supported to the springs by a plate, 6, which is held at one end by the clamp, 4, and by clamps, 7, at its other end to the bed C.

The platform spring is pivotally connected at one end to the axle of a vehicle and the other end is pivoted to the bracket for forming a compensating spring. In addition to giving the body of the car the benefit and elasticity of the platform spring, the elliptical spring 3 is connected to the body of the car and to the platform spring, whereby the body of the car will move only one-half the distance upward or downward if the wheel of the vehicle runs into a rut or over an obstruction. In other words, the body of the vehicle will not receive the entire vibration which is usually received by the body when the wheel of the vehicle passes over an obstruction or into a rut. This is obviated by providing the elliptical spring and the platform spring, which are connected together and both of which are connected to the body of the vehicle.

I do not care to be limited to any particular form of vehicle to which my invention may be applied, as it can be connected to a motor vehicle or to carriages and wagons of any style. I have, however, disclosed my invention as applied to a motor vehicle.

It is evident that more or less slight changes might be resorted to in the form and arrangement of the several parts described without departing from the spirit and scope of my invention, and hence I do not wish to be limited to the exact construction herein set forth, but:

Having fully described my invention, what I claim as new and desire to secure by Letters Patent is:

1. In a vehicle, the combination with a body, of an axle, a platform spring one end of which is pivotally connected to the axle and the other end connected to the body of the vehicle, and an elliptical spring rigidly connected to the body and platform spring.

2. In a vehicle, the combination with a body, of an axle, a bracket connected to the body, a platform spring pivotally connected at one end to the axle and the other end pivotally connected to the bracket, an elliptical spring connected to the platform spring and body and means for supporting an engine bed on the last named spring.

3. A vehicle, the combination with a body, of an axle, a platform spring one end of which is pivotally connected to the axle and the other end pivotally connected to the body of the vehicle and another spring rigidly connected to the body of the vehicle and the platform spring.

4. In a vehicle, the combination with a body, of an axle, a bracket connected to the body, a platform spring pivotally connected to the axle and bracket, and an elliptical spring rigidly connected to the platform spring and to the body.

In testimony whereof I affix my signature, in the presence of two witnesses.

DANIEL H. JAMES.

Witnesses:
FOREST E. WALKER,
MABEL EIKOST.